(12) United States Patent
Weimer

(10) Patent No.: US 6,531,795 B2
(45) Date of Patent: Mar. 11, 2003

(54) DRIVE SYSTEM

(75) Inventor: Jürgen Weimer, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/135,420

(22) Filed: Apr. 30, 2002

(65) Prior Publication Data

US 2002/0121817 A1 Sep. 5, 2002

Related U.S. Application Data

(63) Continuation of application No. 09/594,455, filed on Jun. 15, 2000, now abandoned.

(30) Foreign Application Priority Data

Jun. 15, 1999 (DE) .......................................... 199 27 263

(51) Int. Cl.$^7$ .............................. H02K 9/00; F01P 3/12; B60K 11/02
(52) U.S. Cl. ........................... 310/53; 310/54; 310/58; 310/64; 310/68 C; 123/41.31
(58) Field of Search ...................... 477/13; 237/12.3 R, 237/12.3 B; 192/84.1, 84.2, 84.3, 113.3, 113.31, 113.1; 310/52, 53, 54, 58, 64, 96, 78, 103, 105, 68 B, 68 C; 123/41.31

(56) References Cited

U.S. PATENT DOCUMENTS

| | | | | |
|---|---|---|---|---|
| 4,828,089 A | * | 5/1989 | Collins et al. ........... 192/70.12 |
| 4,955,944 A | * | 9/1990 | Aso et al. ................. 123/41.31 |
| 5,094,332 A | * | 3/1992 | Wall .......................... 192/82 T |
| 5,126,582 A | * | 6/1992 | Sugiyama .................... 290/46 |
| 5,773,904 A | * | 6/1998 | Schiebold et al. ............ 310/92 |
| 5,889,342 A | | 3/1999 | Hasebe .......................... 310/54 |
| 5,906,177 A | * | 5/1999 | Okabe et al. ................. 122/26 |

FOREIGN PATENT DOCUMENTS

| | | | | |
|---|---|---|---|---|
| DE | 434150 | * | 9/1926 | |
| DE | 4106247 | * | 4/1992 | ........... F02N/11/08 |
| DE | 41 06 247 | | 4/1992 | ........... F02N/11/08 |
| DE | 4239834 | * | 6/1994 | ........... F02N/17/06 |
| DE | 42 39 834 | | 6/1994 | ........... F02N/17/06 |
| JP | 52-074805 | | 6/1977 | ............. H02K/9/18 |
| JP | 9-182374 | | 7/1997 | ............. H02K/9/19 |
| JP | 10-285891 | | 10/1998 | ........... H02K/21/22 |
| JP | 11-055810 | | 2/1999 | ........... B60L/11/14 |

* cited by examiner

Primary Examiner—Burton S. Mullins
(74) Attorney, Agent, or Firm—Cohen, Pontani, Lieberman & Pavane

(57) ABSTRACT

A drive system for a motor vehicle includes a drive shaft and an electric machine operatively connected to the shaft for rotating the shaft and obtaining electric energy during rotation of the drive shaft. The electric machine includes a stator arrangement and a rotor arrangement which can be rotated with the aid of the drive shaft and is operated by permanent magnet. A heat transfer arrangement arranged in the drive system for bringing the rotor arrangement to a desired operating temperature and/or to maintain the desired operating temperature.

16 Claims, 2 Drawing Sheets

DRIVE SYSTEM

CROSS-REFERENCE TO RELATED APPLICATIONS

This application is a Continuation of U.S. patent application Ser. No. 09/594,455, filed Jun. 15, 2000 abandoned.

BACKGROUND OF THE INVENTION

1. Field of the Invention

The present invention relates to a drive system for a motor vehicle including an electric machine and a drive shaft, the electric machine being a starter/generator for rotating the drive shaft and obtaining electric energy from a rotating drive shaft, the electric machine having a stator arrangement and a rotor arrangement which can be rotated by the drive shaft and is operated by permanent magnet.

2. Description of the Related Art

In modern drive systems, electric machines are frequently used in so-called starter/generator arrangements to start a drive unit such as, for example, an internal combustion engine, and to generate electric energy when the drive unit is running and the vehicle is in operation for feeding the electrical energy directly into the vehicle network or to charge a battery, i.e., store the energy. However, such electric machines are also used for generating drive energy to supplement or as an alternative to an internal combustion engine. In electric machines with a rotor arrangement operated by permanent magnet, the magnetic field produced by the permanent magnets provided in the rotor arrangement induces a back-e.m.f. in the stator which becomes increasingly larger as the speed of the rotor arrangement increases. If this back-e.m.f. becomes greater than an operating voltage which is, or can be applied to the stator arrangement or stator windings, the electric machine enters a weakened field region in which, by suitably feeding current to the stator windings, a portion of the electric current is used for the purpose of electronic field weakening to be able to operate the electric machine further. The fraction of the field weakening current increases with the speed of the machine, thereby lowering the efficiency of the electric machine at high speeds.

SUMMARY OF THE INVENTION

The object of the present invention is to provide a drive system which has an improved operating capacity over a large speed range.

According to the present invention, the object is achieved by a drive system for a motor vehicle comprising a drive shaft and an electric machine arranged as a starter/generator unit for rotating the drive shaft and obtaining electric energy from the drive shaft when the drive shaft is rotating. The electric machine has a stator arrangement and a rotor arrangement which can be rotated with the aid of the drive shaft and is operated by permanent magnet.

The drive system according to the present invention further include a heat transfer arrangement which may be used, preferably via a heat transfer fluid, to bring the rotor arrangement to a desired operating temperature and/or to maintain the rotor arrangement within a region comprising the desired operating temperature.

The basis of the present invention is the finding that, particularly in the case of rotor arrangements operated by permanent magnet, the magnetic field produced by the permanent magnets decreases with increasing temperature. According to the present invention, the temperature in the region of the rotor arrangement is set to a prescribed relatively high temperature. This ensures that the magnetic field produced by the permanent magnets is smaller, particularly in the case of high speeds. The consequence of this is that the back-e.m.f. induced by the magnetic field of the permanent magnets in the stator arrangement also decreases. The fraction of the field weakening current also decreases and/or the entry into a weakened field region does not occur until a relatively high speed.

The desired temperature may be set, for example, by a heat transfer arrangement comprising a fluid channel arrangement at a housing region arranged adjacent to the rotor arrangement through which heat transfer fluid can flow.

To avoid damage in the region of the rotor arrangement from high temperatures, it is proposed that the desired operating temperature is set to approximately 10–50° C. below a temperature at which an irreversible impairment of the magnetization of the rotor arrangement operated by permanent magnet occurs. For example, the desired operating temperature may be situated in the region of 100° C.–200° C. and is preferably within the range including approximately 140° C.–160° C.

The drive system comprises a drive unit which is to be cooled by a cooling fluid. To configure the drive system according to the present invention as simply as possible, the cooling fluid used in the drive unit forms the heat transfer fluid for the heat transfer arrangement.

Drive units which are cooled generally include internal combustion engines which are at first still cold when put into operation. That is, the cooling fluid, which is usually cooling water, is at a prevailing ambient temperature when the ICE is initially started. Immediately following the start of the internal combustion engine, the temperature thereof rises relatively rapidly. Accordingly, the temperature of the cooling fluid in the internal combustion engine also rises at a rate which is quicker than the temperature in the region of the rotor arrangement. To utilize this rise in temperature for bringing the rotor arrangement relatively quickly to the desired operating temperature, in a first operating phase in which the temperature of the heat transfer fluid is higher than the temperature prevailing in the region of the rotor arrangement, and the temperature prevailing in the region of the rotor arrangement is lower than the desired operating temperature, the heat transfer fluid is fed to the rotor arrangement for the purpose of heat transfer. This effect may be used not only when an internal combustion engine to be cooled is used as a drive unit, but always whenever a heat transfer fluid such as, for example, a cooling fluid has a higher temperature than that temperature which prevails in the region of the rotor arrangement.

Internal combustion units typically have a maximum temperature for the cooling fluid in the range of approximately 80° C.–120° C. However, this range is generally below the temperature at which, in accordance with the present invention, the rotor arrangement preferably operates. Thus, if the procedure of feeding this cooling fluid as heat transfer fluid to the rotor arrangement or to the heat transfer arrangement for the rotor arrangement were to be continued, it would be difficult to achieve the desired operating temperature at the rotor arrangement in a relatively short time. It is therefore proposed that in a second operating phase in which the temperature of the heat transfer fluid is not higher than the temperature prevailing in the region of the rotor arrangement, and the temperature prevailing in the region of the rotor arrangement is lower than the desired operating temperature, the supply of the heat transfer fluid from the drive unit is at least diminished and preferably essentially completely interrupted. In this phase, heat may be fed to the rotor arrangement from other heat sources such as, for example, the internal combustion engine via thermal radiation or from a coupling arrangement or, if appropriate, also from the stator arrangement.

In a third operating phase in which the temperature prevailing in the region of the rotor arrangement is in the region of the desired operating temperature, the heat transfer fluid is fed for the purpose of keeping the rotor arrangement at the desired operating temperature. In effect, this means that heat transfer fluid which transfers thermal energy to the rotor arrangement during the starting phase now extracts from the rotor arrangement thermal energy which is fed, for example, to the stator arrangement, directly to an internal combustion engine or to a friction clutch.

It is preferably provided in the present invention that the desired operating temperature is a function of the speed of the rotor arrangement. The desired operating temperature may be higher during a higher speed of the rotor arrangement than during a lower speed of the rotor arrangement. The invention makes use here of the fact that, as already mentioned, the magnetic flux or the field strength of the permanent magnets of the rotor arrangement generally increases with decreasing temperature. However, at lower speeds the induced back-e.m.f. is still low, in any case lower than the operating voltage applied to the stator arrangement, so that here prescribing a lower desired operating temperature firstly has the advantage that a greater efficiency of the electric machine can be achieved because of the higher field strength of the permanent magnets.

The present invention further relates to a method for operating a drive system, the drive system having a drive shaft and an electric machine connected for rotating the drive shaft and obtaining electric energy from the rotation of the drive shaft, the electric machine having a stator arrangement and a rotor arrangement which can be rotated via the drive shaft and is operated by permanent magnet, the method comprising the steps of:

(a) determining a desired operating temperature for the rotor arrangement; and (b) setting the temperature prevailing in the region of the rotor arrangement at the desired operating temperature via a closed temperature loop.

Step (b) may comprise setting the temperature prevailing in the region of the rotor arrangement by feeding a heat transfer fluid to the rotor arrangement.

To avoid damaging the electric machine, particularly in the case of defective drives, the desired operating temperature is a temperature which is situated approximately 10–50° C. below a temperature at which an irreversible impairment of the magnetization of the rotor arrangement operated by permanent magnet may occur.

Step (b) may comprises the following measures:

(c) in a first operating phase in which the temperature of the heat transfer fluid is higher than the temperature prevailing in the region of the rotor arrangement, and the temperature prevailing in the region of the rotor arrangement is lower than the desired operating temperature, feeding the heat transfer fluid to the rotor arrangement for the effecting heat transfer, (d) in a second operating phase in which the temperature of the heat transfer fluid is not higher than the temperature prevailing in the region of the rotor arrangement, and the temperature prevailing in the region of the rotor arrangement is lower than the desired operating temperature, diminishing the feeding of the heat transfer fluid and preferably interrupting the feeding of the heat transfer fluid, and (e) in a third operating phase in which the temperature prevailing in the region of the rotor arrangement is in the region of the desired operating temperature, feeding the heat transfer fluid maintaining the temperature of the rotor arrangement at the desired operating temperature via a closed temperature loop.

As already described previously, the desired temperature for the rotor arrangement may be set in step a) as a function of the speed of the rotor arrangement, wherein the desired temperature increases as the speed increases.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
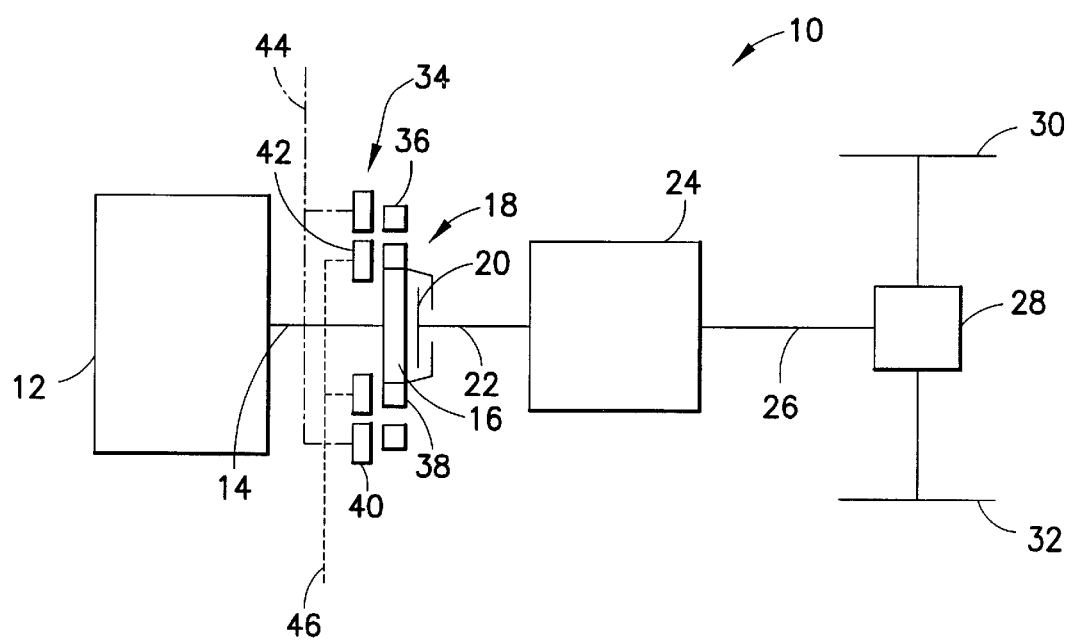
FIG. 1 is a schematic diagram of a drive system according to an embodiment of the present invention.

A drive system 10 according to an embodiment of the present invention is illustrated in FIG. 1 which comprises an internal combustion engine 12 as drive unit, a flywheel 16 of a friction clutch 18 coupled to a drive shaft 14, for example, a crankshaft 14 of the internal combustion engine 12. The clutch disk 20 of the friction clutch 18 is connected via a transmission input shaft 22 to a transmission 24 which drives wheels 30, 32 via a transmission output shaft 26 and a differential 28. It may be pointed out that the internal combustion engine 12, the clutch 20, the transmission 24 and various other components may comprise any desired design.

The drive system 10 according to the present invention further comprises an electric machine 34 arranged as a starter/generator arrangement. As described in further detail below with reference to FIG. 2, the electric machine 34 has a stator arrangement 36 with one or more stator windings, which interacts electromagnetically with a rotor arrangement 38 which can rotate with the flywheel 16. The rotor arrangement 38 is operated by permanent magnet, that is to say it supports a plurality of permanent magnets. The electromagnetic interaction between the permanent magnets of the rotor arrangement 38 and the windings of the stator arrangement 36, or the respective magnetic fields, allows the electric machine 34 to generate a torque which may be used to drive the crankshaft 14 to rotation, and thus the drive train. Furthermore, the electromagnetic interaction also allows the electric machine 34 to convert this kinetic energy partially into electric energy in conjunction with the rotation of the crankshaft 14. The electric energy may then be fed into the regional network or into a battery.

FIG. 1 also shows that the stator arrangement 36 further comprises a heat transfer arrangement or a cooling arrangement 40 to allow the removal of heat produced in the stator arrangement 36 by electric losses. The rotor arrangement 38 is also assigned a heat transfer arrangement 42 in order, as described in more detail below, to set the rotor arrangement 38 to a desired temperature. The two heat transfer arrangements 40, 42 are connected via respective fluid lines 44, 46 to a source for heat transfer fluid.

The design, in particular, of the electric machine 34 is described in detail below with reference to FIG. 2.

Figure 2:
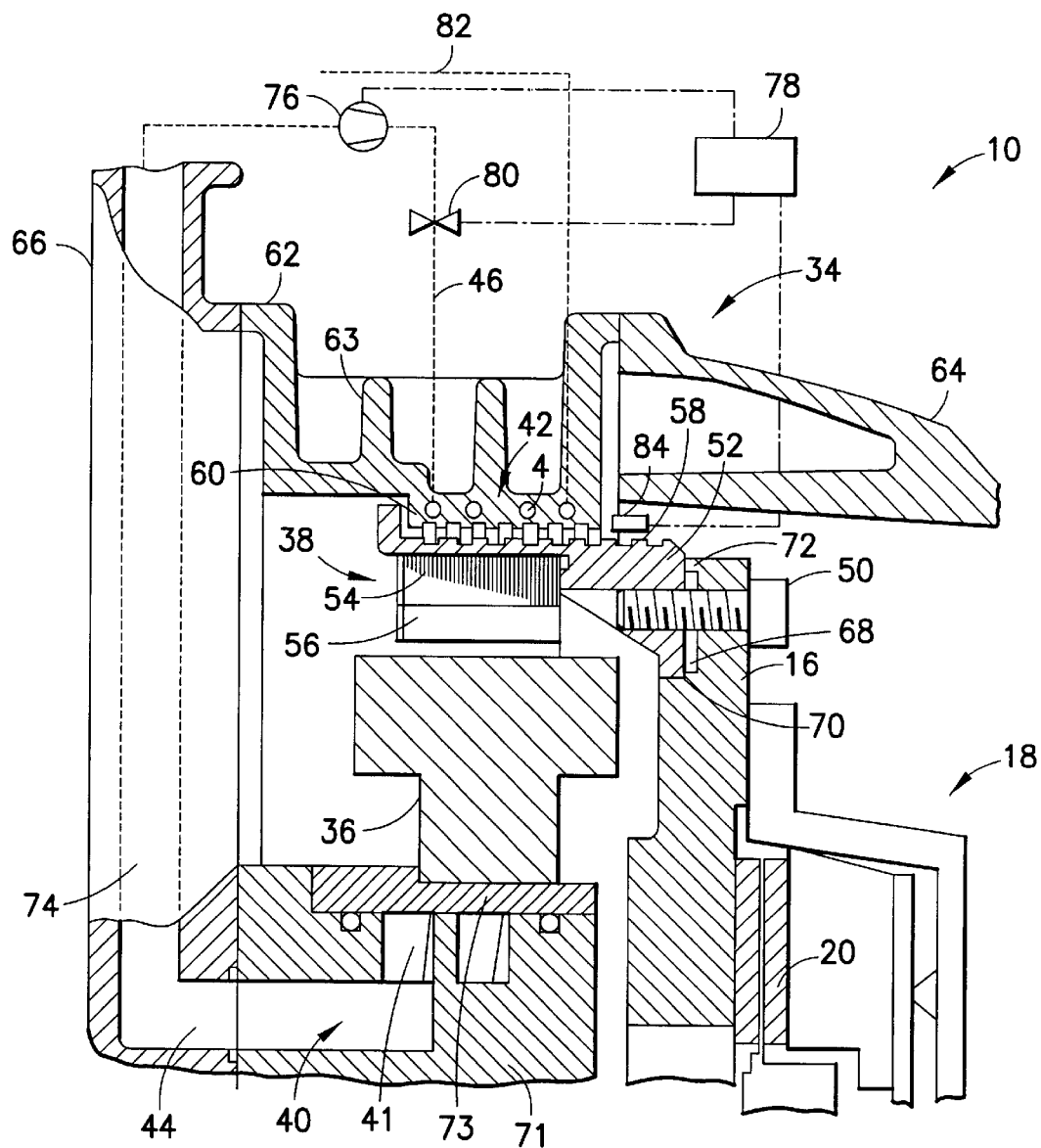
FIG. 2 is a partial longitudinal sectional view of the drive system of FIG. 1 in the region of an electric machine.

FIG. 2 shows that the rotor arrangement 38 comprises an approximately annular rotor carrier 52 permanently connected to the flywheel 16 via a plurality of bolts 50. An inner circumferential surface of the rotor carrier 52 supports as a rotor yoke a plurality of disk-like metal rings 54. A plurality of permanent magnets 56 are supported on the inner circumferential surface of the disk-like metal rings 54. Cooling ribs are arranged on an outer circumferential surface of the rotor carrier 52. The cooling ribs 58 preferably have the same width and depth. Situated in opposition to the cooling ribs 58 are cooling ribs 60 of a housing part 62 which connects a transmission bell housing 64 to a wall 66 of the engine block. The housing part 62 further includes external cooling ribs 63 which may be used to amplify emission of heat to the outside.

The connection of the rotor carrier 52 to the flywheel 16 is configured such that transfer of heat between the two components is impeded. This prevents heat generated at the flywheel during the intermittent heating of the flywheel 16 during operation of the friction clutch 18 from being transferred to the rotor carrier 52. A cutout 68 formed in the radially outer region of the flywheel 16 forms two annular sections 70, 72 on the flywheel such that the rotor carrier 52 bears only on the two annular sections 70, 72. An insulating material may also be arranged between each screw head and the flywheel and the openings of the flywheel 16 penetrated by the screws 50 may have a larger diameter than the screw shanks for facilitating the thermal isolation of the rotor carrier 52.

The stator arrangement 36 with its windings (not shown in detail) is supported on a stator carrier 71 which is likewise supported on the wall 66 of the engine block. The heat transfer arrangement 40 of the stator arrangement 36 comprises a duct system 41 arranged in the stator carrier 71 which is sealed radially toward the outside by a cover ring 73. The stator arrangement 36 is fixed onto the cover ring 73. The duct system 41 is connected via a line 44 to an engine block cooling water jacket 74 provided in the wall 66 of the engine block. That is, the cooling water flowing through the engine block enters the duct system 41 via the line 44, and can therefore cool the stator arrangement 36. The exit of the duct system 41 is not illustrated in FIG. 2.

The housing part 62 also includes a duct system 43 as part of the heat transfer arrangement 42 which can likewise be connected to the cooling water jacket 74, for example via a line 46. In addition, a pump 76 and a valve 80 may be arranged in the heat transfer arrangement 42 and controlled by a control device 78. The duct system 43 returns the cooling fluid to its source via an exit 82. A temperature sensor 84 is also provided in the region of the stator arrangement 36. The temperature sensor 84 transmits a temperature signal to the control device 78. The temperature signal represents the temperature prevailing in the region of the rotor arrangement 38. The sensor 84 may, for example, also be arranged directly on the rotor arrangement 38, so that the temperature detected by the temperature sensor 84 is closer to the actual temperature of the rotor arrangement 38 or the permanent magnets 56 arranged therein.

The operation of the drive system 10 according to the present invention is described below. In a first operating phase, we will assume that the drive unit, i.e., the internal combustion engine 12, that is being started and thus also the cooling fluid which circulates in the water jacket 74 is cold, i.e., at the prevailing ambient temperature. When the internal combustion engine 12 is put into operation, the cooling fluid begins to circulate through the water jacket and is heated up in the process relatively quickly. Accordingly, the temperature of the cooling fluid will be above the ambient temperature in a relatively short time. Since this is the case, the cooling fluid is fed to the duct system 42 with the aid of the control device 78 by driving the pump 76 and controlling the valve 80 immediately following the starting of the drive unit. The result of this operation is that the housing part 62 is heated, in particular in the region of the cooling ribs 60. The cooling ribs 60 then radiate heat onto the still colder cooling ribs 58 of the rotor carrier 52 so that the rotor arrangement 38 is heated. The cooling fluid is simultaneously fed to the duct system 40 for the stator arrangement 36 to remove the heat produced in the stator arrangement 36. A further portion of the heat produced in the stator arrangement 36 is radiated radially outward to the permanent magnets 56 of the rotor arrangement 38 for additionally heating the rotor arrangement 38. Again, if only to a slight extent, thermal energy is transferred from the flywheel 16 to the rotor arrangement 38 in conjunction with slipping operation of the clutch 18. Furthermore, thermal energy will also pass directly by radiation from the wall 66 of the engine block to the permanent magnets 56 of the rotor arrangement 38.

As stated above, the desired operating temperature of the rotor arrangement is in the range including 100° C.–200° C. and preferably within the range of 140° C.–160° C. Accordingly, once the cooling fluid of the internal combustion engine 12 has reached its maximum temperature in the region of 80° C.–120° C., this cooling fluid can no longer be used for further heating the rotor arrangement 38. Consequently, in a second operating phase in which the desired operating temperature, that is to say the desired operating temperature of the rotor arrangement 38, is above this maximum temperature of the cooling fluid of the internal combustion engine 12, the feeding of this cooling fluid to the duct system 42 is interrupted at least partially, preferably completely, with the result that heat is fed to the rotor arrangement 38 only by the other heat sources mentioned above. The feeding of the cooling fluid of the internal combustion engine to the duct system 42 resumes in a third operating phase when, after a certain operating time, the rotor arrangement 38 has reached the prescribed or desired operating temperature to maintain the rotor arrangement 38 at the desired operating temperature in a closed temperature loop by removing thermal energy from the rotor arrangement 38, to the housing part 62, and thus toward the cooling fluid.

This operation may be further supported, for example, by also supplying the duct system 40 for the stator arrangement 36 with cooling fluid via an appropriate pump and valve arrangement. In this case, the valve closes for preventing cooling fluid from entering the duct system in the first operating phase to dissipate the heat produced in the stator arrangement 36 toward the rotor arrangement 38. When the rotor arrangement 38 is to be cooled, the valve opens to also cool the stator arrangement 36 more intensely so as likewise to diminish the thermal radiation from the stator arrangement 36 to the rotor arrangement 38.

The preferably maximum feeding of the cooling fluid to the duct system 43 of the rotor arrangement 38 occurs in the first operating phase in which the temperature of the rotor arrangement is below the temperature of the cooling fluid and below the desired operating temperature to transfer thermal energy from the cooling fluid to the rotor arrangement 38. The feeding of the cooling fluid to the duct system 43 is then essentially prevented in the second operating phase in which the temperature in the region of the rotor arrangement 38 is higher than the temperature of the cooling fluid, but still lower than the desired operating temperature to heat the rotor arrangement 38 via other heat sources. Once the rotor arrangement 38 has reached the desired operating temperature in the third operating phase, the cooling fluid is fed once again to the duct system 43 in a closed cooling loop to maintain the rotor arrangement 38 at the desired temperature.

The reason that the desired operating temperature of the rotor arrangement 38 is set to a temperature region of 140° C.–160° C. during higher speeds of the internal combustion engine and thus the rotor arrangement 38 is that the permanent magnets 56 generally have a negative temperature coefficient. That is, the field strength of permanent magnets decreases with rising temperature. Setting the operating temperature of the rotor arrangement 38 to a relatively high temperature in conjunction with higher speeds causes the reduced magnetic field of the permanent magnets 56 to induce a likewise diminished back-e.m.f. in the stator arrangement 36. The setting of the high temperature delays entry into the weakened field region of operation in which a not inconsiderable proportion of the electric current is used only for field weakening of the field of the permanent magnets and not for generating torque. The high temperature diminishes the proportion of the field weakening current compared with the proportion of the torque-generating current. Accordingly, the power loss in the region of the electric machine 34 at higher speeds is thereby diminished.

If it is detected that the machine is to operate at lower speeds for which the induced back-e.m.f. is in any case smaller than the operating voltage applied to the stator arrangement 36, so that no weakened field region is present, the desired operating temperature of the rotor arrangement 38 may be set to a lower value to make use here of the negative temperature coefficient of the permanent magnets 56. The negative temperature coefficient means that if the temperature in the region of the rotor arrangement 38 drops, the magnetic field produced by the permanent magnets 56 increases in intensity, with the result that the electromagnetic interaction between the stator arrangement 36 and the rotor arrangement 38 increases. Accordingly, the machine can operate at higher efficiency. NdFeB alloys, for example, could be used as material for such permanent magnets 56.

The temperature to which, in particular at higher speeds, the desired operating temperature is to be set should have a specific safety clearance of, for example, 10–50° C. below that temperature at which irreversible impairments of the magnetization could occur in the region of the permanent magnets 56. This safety clearance ensures that, for example, even in the case of a short-term failure of the feeding of the cooling fluid, or defective application of current to the stator arrangement 36, the temperature in the region of the rotor arrangement 38 cannot rise so high that damage occurs in the region thereof which can no longer be remedied. In particular, it is to be ensured that when the permanent magnets 56 are bonded to the rotor arrangement 38, the maximum temperatures occurring cannot cause damage to the adhesive used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A drive system for a motor vehicle, comprising:
   a drive shaft arranged for rotating about an axis of rotation;
   an electric machine having a stator arrangement and a rotor arrangement rotatable relative to said stator arrangement for rotation about said axis of rotation with said drive shaft, said rotor arrangement having permanent magnets, wherein said electric machine is selectively operable as a motor for producing a torque for rotating said drive shaft and as a generator for obtaining electric energy from rotation of the drive shaft; and
   a heat transfer arrangement operatively arranged for conducting a heat transfer fluid in a closed loop for selectively adding heat to said rotor arrangement for heating said rotor arrangement to a desired operating temperature range of said rotor arrangement and maintaining said rotor arrangement at said desired operating temperature, wherein said desired operating temperature of said rotor arrangement is approximately 10–50° C. below a temperature at which an irreversible impairment of a magnetization of the rotor arrangement occurs.

2. The drive system of claim 1, further comprising a housing arranged adjacent to said rotor arrangement, wherein said heat transfer arrangement comprises a fluid channel arrangement in said housing for conducting heat transfer fluid.

3. The drive system of claim 1, wherein the desired operating temperature is within a range including 100° C.–200° C.

4. The drive system of claim 1, wherein the desired operating temperature is within a range including 140° C.–160° C.

5. The drive system of claim 1, further comprising a drive unit having a cooling water jacket, said heat transfer arrangement being operatively connected to said cooling water jacket for permitting a flow of heat transfer fluid therebetween.

6. The drive system of claim 1, wherein said desired operating temperature is dependent upon a rotary speed of said rotor arrangement.

7. The drive system of claim 6, wherein said desired operating temperature increases as the speed of said rotor arrangement increases.

8. A drive system for a motor vehicle, comprising:
   a drive shaft arranged for rotating about an axis of rotation;
   an electric machine having a stator arrangement and a rotor arrangement rotatable relative to said stator arrangement for rotation about said axis of rotation with said drive shaft, said rotor arrangement having permanent magnet, wherein said electric machine is selectively operable as a motor for producing a torque for rotating said drive shaft and as a generator for obtaining electric energy from rotation of the drive shaft; and a heat transfer arrangement operatively arranged for conducting a heat transfer fluid in a closed loop for selectively adding heat to said rotor arrangement for heating said rotor arrangement to a desired operating temperature range of said rotor arrangement and maintaining said rotor arrangement at said desired operating temperature, wherein said heat transfer arrangement is operatively arranged so that in a first operating phase in which a temperature of the heat transfer fluid is higher than a temperature prevailing in the region of said rotor arrangement, and the temperature prevailing in the region of said rotor arrangement is lower than said desired operating temperature, the heat transfer fluid is fed to said rotor arrangement for heat transfer.

9. The drive system of claim 8, wherein said heat transfer arrangement is operatively arranged so that in second operating phase in which a temperature of the heat transfer fluid is not higher than a temperature prevailing in a region of said rotor arrangement, and the temperature prevailing in the region of the rotor arrangement is lower than said desired operating temperature, the supply of the heat transfer fluid is diminished.

10. The drive system of claim 9, wherein said supply of heat transfer fluid is interrupted in said second operating phase.

11. The drive system of claim 9, wherein said heat transfer arrangement is operatively arranged so that in a third operating phase in which the temperature prevailing in the region of the rotor arrangement is at the desired operating temperature, the heat transfer fluid is fed to said rotor arrangement in a closed loop so that the temperature in the region of the rotor arrangement is maintained at the desired operating temperature.

12. A method for operating a drive system for a motor vehicle having a drive shaft and an electric machine, the electric machine being selectively operable as an electric motor for rotating the drive shaft and as a generator for obtaining electric energy from the rotating drive shaft, the electric machine having a stator arrangement and a rotor arrangement which is fixed with respect to rotation relative to the drive shaft and is operated by a permanent magnet, the method comprising the steps of:

(a) determining a desired operating temperature for the rotor arrangement to a temperature approximately 10–50° C. below a temperature at which an irreversible impairment of the magnetization of the rotor arrangement occurs; and (b) setting the temperature prevailing in the region of the rotor arrangement to the desired operating temperature determined in said step (a).

13. The method of claim 12, wherein said step (b) comprises setting the temperature prevailing in the region of the rotor arrangement by feeding a heat transfer fluid.

14. The method of claim 12, wherein said step (a) comprises setting the desired operating temperature for the rotor arrangement as a function of the speed of the rotor arrangement.

15. The method as claimed in claim 14, wherein said step (a) comprises increasing the setting of the desired operating temperature for the rotor arrangement as the speed of the rotor arrangement increases.

16. A method for operating a drive system for a motor vehicle having a drive shaft and an electric machine, the electric machine being selectively operable as an electric motor for rotating the drive shaft and as a generator for obtaining electric energy from the rotating drive shaft, the electric machine having a stator arrangement and a rotor arrangement which is fixed with respect to rotation relative to the drive shaft and is operated by a permanent magnet, the method comprising the steps of:

(a) determining a desired operating temperature for the rotor arrangement; and (b) setting the temperature prevailing in the region of the rotor arrangement to the desired operating temperature determined in said step (a), wherein said step (b) comprises the steps of:

(c) feeding the heat transfer fluid to the rotor arrangement for heat transfer if the drive system is in a first operating phase in which a temperature of the heat transfer fluid is higher than a temperature prevailing in the region of the rotor arrangement, and the temperature prevailing in the region of the rotor arrangement is lower than the desired operating temperature;

(d) diminishing the supply of the heat transfer fluid to the rotor arrangement if the drive system is in a second operating phase in which the temperature of the heat transfer fluid is not higher than the temperature prevailing in the region of the rotor arrangement, and the temperature prevailing in the region of the rotor arrangement is lower than the desired operating temperature, and (e) feeding of the heat transfer fluid is performed for the purpose of keeping the rotor arrangement temperature at the desired operating temperature by a closed temperature loop when the drive system is in a third operating phase in which the temperature prevailing in the region of the rotor arrangement is at the desired operating temperature.

* * * * *